(12) United States Patent
van Rensburg (10) Patent No.: US 8,830,878 B1
(45) Date of Patent: Sep. 9, 2014

(54) HANDLING CONNECTIONS TO REASSIGNED NUMBERS

(71) Applicant: RingCentral, Inc., San Mateo, CA (US)

(72) Inventor: Christopher van Rensburg, Foster City, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 14/231,446

(22) Filed: Mar. 31, 2014

(51) Int. Cl.
*H04L 12/16* (2006.01)
*H04M 3/58* (2006.01)
*H04L 29/06* (2006.01)

(52) U.S. Cl.
CPC .............. *H04M 3/58* (2013.01); *H04L 65/1096* (2013.01)
USPC ...................... 370/271; 379/32.04; 379/32.05; 379/88.19; 379/142.06

(58) Field of Classification Search
USPC ................. 370/271; 379/32.04, 32.05, 88.19, 379/142.06
See application file for complete search history.

(56) References Cited

U.S. PATENT DOCUMENTS

| 8,090,840 | B2 * | 1/2012 | Jackson | 709/227 |
| 8,416,923 | B2 | 4/2013 | Lawson et al. | |
| 2006/0126810 | A1 * | 6/2006 | Wilson et al. | 379/142.01 |
| 2008/0298576 | A1 * | 12/2008 | Tashiro et al. | 379/245 |
| 2011/0119276 | A1 * | 5/2011 | Borghetti et al. | 707/748 |
| 2014/0122467 | A1 * | 5/2014 | Mandel et al. | 707/723 |

* cited by examiner

*Primary Examiner* — Wanda Z Russell
(74) *Attorney, Agent, or Firm* — Weaver Austin Villeneuve & Sampson LLP (57) ABSTRACT

Techniques are described for better ensuring that calls or transmissions directed to a subscriber or endpoint to which a number was previously assigned are not received by a new subscriber or endpoint. According to one class of implementations, a telephony platform maintains a registry that associates a secondary identifier with each phone number that is currently assigned to a subscriber. The identifier may point to and/or include any of a variety of information that maps to the current subscriber. When a calling party initiates a call to an assigned number, an additional identifier is transmitted with the call routing information that corresponds to the entity or endpoint to which the call is directed. The telephony platform makes call routing decisions based on the correspondence of this information with the information maintained in the registry.

30 Claims, 5 Drawing Sheets

HANDLING CONNECTIONS TO REASSIGNED NUMBERS

FIELD

The present disclosure relates to communications systems, and particularly, to telephony services.

BACKGROUND

Providers of telephony services maintain a pool of phone numbers that are assigned to endpoints associated with their subscribers. These phone numbers may be reassigned when, for example, a subscriber's subscription is terminated or when an endpoint associated with a subscriber is repurposed, replaced, or eliminated. Before reassigning a phone number, most service providers quarantine the number for a period of time (e.g., six months) to allow for the number to become disassociated with the former endpoint or subscriber. During this quarantine period, calling parties are typically notified that the number is no longer in service. Once the quarantine period ends, the number is placed back in the pool of phone numbers and made available for reassignment. The basic premise of this approach is that passage of the quarantine period in combination with the notification of callers during the quarantine period makes it less likely that the new subscriber to which the number is reassigned will receive calls intended for the old subscriber.

While this approach may reduce the likelihood that calls intended for one party are received by another, it is often ineffective. That is, the quarantine period is typically not long enough to ensure that all parties who might call the previous subscriber become aware of the change. This results in connections being made that are frustrating and disruptive to both the calling party and the new subscriber. Telephony service providers can increase the quarantine period to further reduce the likelihood of such connections. However, there is an ongoing cost to the provider for maintaining control of each phone number that cannot be recouped during the period when the number is quarantined.

SUMMARY

Methods, systems, and computer program products are provided herein for managing numbers, addresses, or pointers associated with endpoints in communication systems. According to various implementations, first identifying information is associated with an endpoint identifier. The endpoint identifier corresponds to a network endpoint. The first identifying information represents a first entity to which the network endpoint is assigned. An incoming transmission is received that is directed to the network endpoint and has second identifying information associated therewith. The second identifying information represents a second entity to which the incoming transmission is directed. The second identifying information is compared with the first identifying information to determine whether the second entity corresponds to the first entity. Where the second entity corresponds to the first entity, the incoming transmission is directed to the network endpoint.

According to some implementations, the endpoint identifier is one of a phone number, an email address, or a uniform resource identifier (URI). According to some implementations in which the endpoint identifier is a phone number, the first entity is an organization or a person, role, or group associated with the organization.

According to some implementations, a second incoming transmission is received that is directed to the network endpoint and has third identifying information associated therewith. The third identifying information represents a third entity to which the second incoming transmission is directed. The third identifying information is compared with the first identifying information to determine whether the third entity corresponds to the first entity. Where the third entity does not correspond to the first entity, the second incoming transmission is prevented from connecting to the network endpoint.

According to some implementations, a notification is transmitted to a device from which the second incoming transmission originated. The notification indicates that the network endpoint has been reassigned.

According to some implementations, the second identifying information is distinct from routing information associated with the incoming transmission.

A further understanding of the nature and advantages of various implementations may be realized by reference to the remaining portions of the specification and the drawings.

DETAILED DESCRIPTION

Reference will now be made in detail to example embodiments of the present disclosure. These example embodiments are illustrated in the accompanying drawings. While the disclosure is described in conjunction with these example embodiments, it will be understood that it is not intended to limit the disclosure to the described embodiments. On the contrary, it is intended to cover alternatives, modifications, and equivalents as may be included within the spirit and scope of the present disclosure as defined by the appended claims. In the following description, specific details are set forth in order to provide a thorough understanding of the present disclosure. Other example embodiments may be practiced without some or all of these specific details. In addition, well known features may not have been described in detail to avoid unnecessarily obscuring the present disclosure.

This disclosure describes techniques for better ensuring that calls or transmissions directed to a subscriber or endpoint to which a number (or other form of identifying address or pointer) was previously assigned are not received by a new subscriber or endpoint to which that number, address, or pointer has been reassigned. Such techniques may also reduce or obviate the need for the quarantine of numbers, addresses, or pointer, at least in some circumstances, before they are reassigned. According to one example implementation, a telephony platform maintains a registry that associates a secondary identifier with each phone number that is currently assigned to a subscriber. The identifier points to and/or includes any of a variety of information that maps to the current subscriber. Such information includes, for example, a name of a person, a name of an organization, an organizational role within an organization, a group within an organization, etc. According to some implementations, at least some of the information maintained in the registry maps uniquely to the current subscriber or a specific entity associated with a subscriber using, for example, a globally unique identifier (GUID).

When a calling party initiates a call to an assigned phone number associated with the telephony platform, an additional identifier is transmitted with the call routing information that corresponds to the entity or endpoint to which the call is directed. This identifier points to and/or includes any of a variety of information that maps to the intended recipient of the call including, for example, a name of a person, a name of an organization, an organizational role within an organization, a group within an organization, etc. As will be discussed below, the telephony platform then makes call routing decisions based on the correspondence of this information with the information maintained in the registry for the phone number to which the call is directed. It should be noted that, while example implementations are described with reference to the context of a telephony platform, this disclosure is not so limited. As will become clear, the techniques described herein are applicable to a wide range of applications in which identifiers (e.g., numbers, addresses, pointers, etc.) that are potentially ambiguous and subject to reassignment are used to facilitate connections or communications. For example, the techniques disclosed herein would be useful for managing Internet domain names, a context in which conciseness is desirable and where supply of concise domain names that can be memorized is limited. Another example is the management of user names for a web service, e.g., e-mail address. Given the diversity of these examples, the scope of the present disclosure should not be limited by reference to particular features of implementations described below. For example, references to "number" or "phone number" should be understood to relate to implementations in the context of a telephony platform or service, and will be understood to more broadly represent the wide variety of numbers, addresses, and pointers that may be managed according to the techniques described herein.

Figure 1:
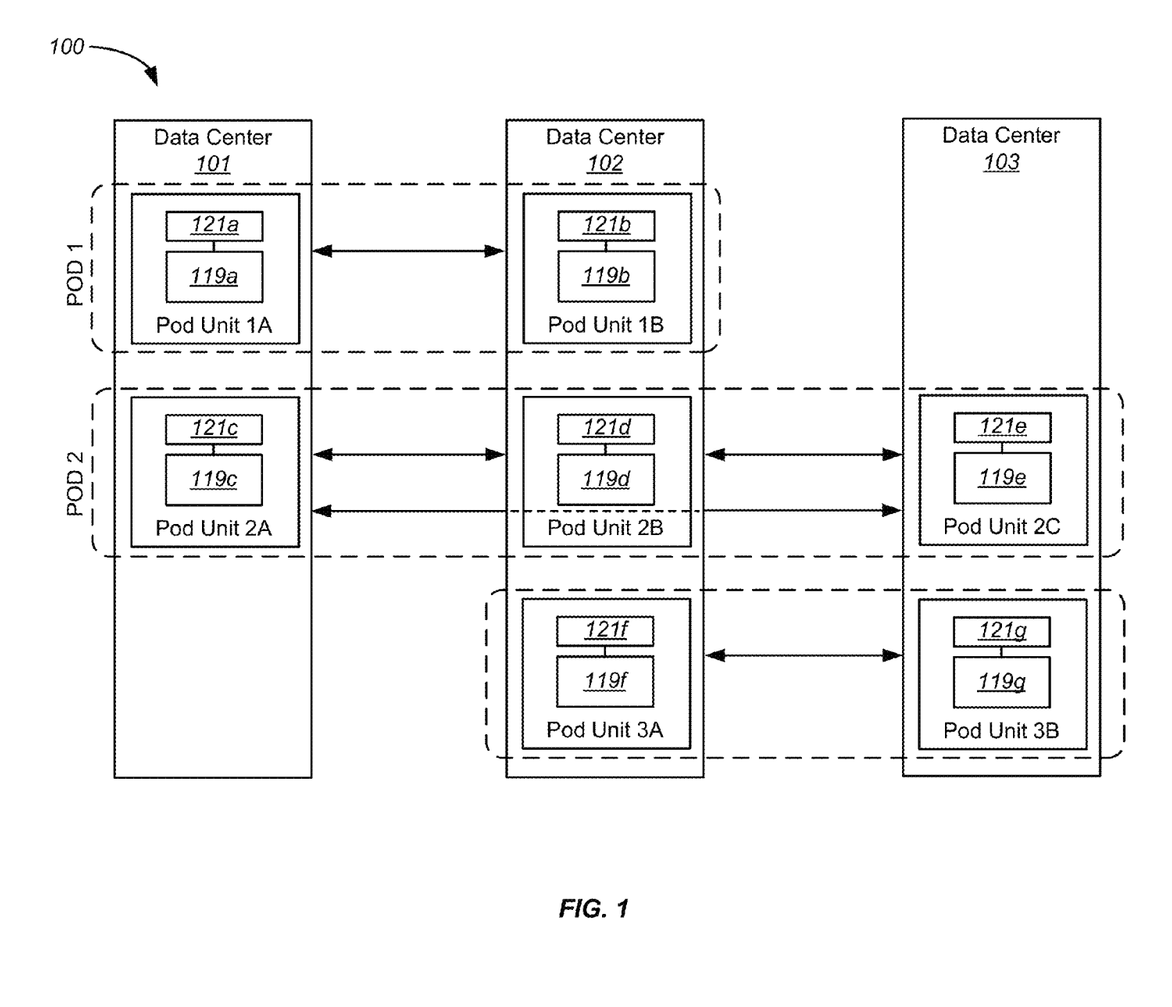
FIGS. 1 and 2 are simplified diagrams of an example of a communication system in which various implementations described herein may be practiced.

An example implementation will now be described in the context of a cloud-based communication system such as the one illustrated in FIGS. 1-3. FIG. 1 shows a communication system 100 which can be, for example, a hosted Private Branch Exchange (PBX) platform that provides voice and video over IP, fax services, etc. Communication system 100 includes data centers 101, 102, and 103. Each data center is a point of presence (POP) that includes the network computing resources (e.g., servers, routers, switches, network connections, storage devices, etc.) necessary to support the services provided by communication system 100. Each data center is typically located in a different geographical region.

In this example, communication system 100 includes three user points of data (pods), i.e., pods 1, 2 and 3, each of which is a logical grouping of two or more pod units situated in different data centers. Each pod serves a different subset of user accounts. In this example, each pod unit (e.g., unit 2A) serves the same subset of users as the other pod units within the same pod (e.g., pod units 2B and 2C). Each pod unit includes a communication server 119a-119g configured to provide substantially the same services to the same subset of users as the other pod units within the same pod. Each pod unit also includes an account database 121a-121g configured to support the respective communication servers for the corresponding subset of users. It should be noted that the term "user" is being used in the interest of brevity and may refer to any of a variety of entities that may be associated with a subscriber account such as, for example, a person, an organization, an organizational role within an organization, a group within an organization, etc.

Figure 2:
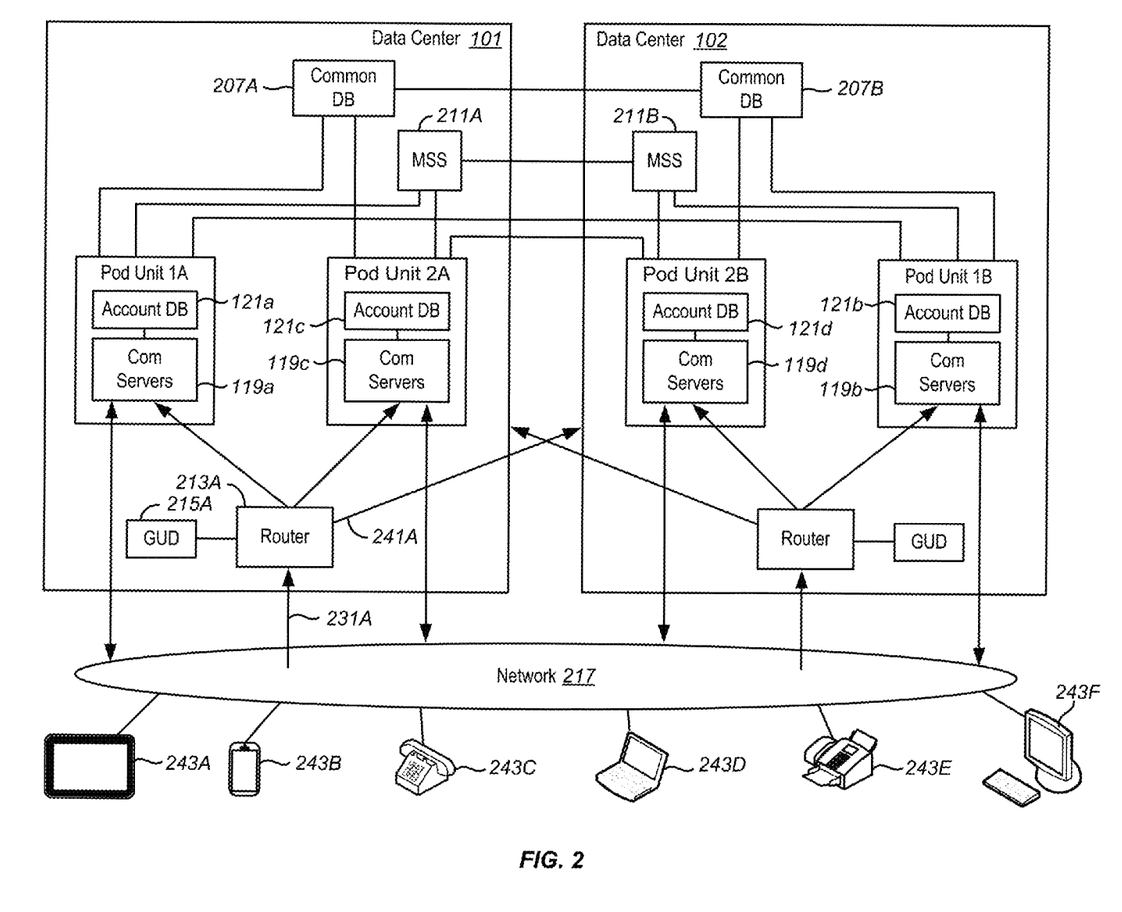

FIG. 2 shows various components of communication system 100 of FIG. 1. Specifically, FIG. 2 shows the various interconnections within and between data centers 101 and 102. Both data centers are in communication with network 217. Service requests from various communication devices 243A-243F are routed through network 217 to either or both of the data centers. Devices 243A-243F represent a diversity of client devices that connect with a services system designed in accordance with one or more implementations as described herein. Such client devices include, for example (and without limitation), cell phones, smart phones, tablets, laptop and desktop computers, conventional telephones, IP phones, teleconferencing devices, videoconferencing devices, set top boxes, gaming consoles, etc. Reference to specific client device types should therefore not be used to limit the scope of the present disclosure.

Data center 101 includes pod units 1A and 2A, a common database (CDB) 207A, a message storage system (MSS) 211A, a router 213A, and a global user directory (GUD) 215A. Additional pod units (not shown) may also be included in data center 101. Data center 102 is similarly configured and includes components that operate substantially the same as those in data center 101. Data centers 101 and 102 provide backup and redundancy to one another in the event of failure.

Communication servers 119 provide telecommunication services (e.g., voice, video, email, and/or facsimile) to corresponding subsets of users. Each server 119 may also provide other services including, for example, user account management and configuration, billing services, accounting services, etc. Each pod unit includes an account database 121 to support the communication server(s) for that particular pod unit, storing configuration details and other information regarding each user's account.

Pod units 1A and 1B are in communication with one another so that the data on their respective account databases are synchronized across data centers. Data center 101 includes router 213A to receive an incoming service request 231A from network 217. Router 213A parses the incoming service request to identify or extract a user key and queries GUD 215A to determine which pod is associated with the user key. Once the associated pod has been identified router 213A routes the service request to the pod unit in the data center associated with the identified pod. If the pod unit associated with the identified pod is not associated with data center 101, router 213A may route the service request to another data center (e.g., data center 102 as indicated by the arrow 241A).

According to some example implementations, the routing of a service request (e.g., an incoming phone call) by router 213A may depend on whether the entity to which the request is directed (e.g., as determined from an identifier associated with the request) maps to the user, subscriber, or endpoint to which the number used to initiate the request is assigned (e.g., as indicated in a registry configured as described herein). Such a registry may be part of or associated with, for example, account databases 121, CDB 207A or GUD 215A or be a separately maintained registry across one or more of the data centers. Such a registry may be maintained in a distributed manner. For example, the secondary identifiers associated with the registry may be stored in conjunction with other information relating to the numbers or endpoints with which they are associated, e.g., in account databases 121. Moreover, the routing of service requests in accordance with such a registry may be performed at any of a variety of points in the system (e.g., routers 213, communication servers 119, etc.) before a final connection is made to the endpoint to which the service request or incoming call is directed. The scope of the present disclosure should therefore not be limited by reference to specific examples described herein.

Each pod unit of the data center 101 is also coupled to MSS 211A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 211A are synchronized with other data centers (e.g., synchronized with MSS 211B of data center 102).

Each pod unit in data center 101 is coupled to common database 207A which stores shared data for all of the pods, and stores consolidated information from account databases 121. Common database 207A also facilitates changes to the pod databases. For example, common database 207A may store data for applications that provide the services on communication servers 119. Such data may include, for example, registry data for supporting call handling as described herein. Different versions of the applications data may be stored in common database 207A which allow changes and upgrades to communication servers 119 to be implemented efficiently and conveniently. Changes may be made to common database 207A and propagated to pod units 1A and 2A. Common database 207A is synchronized across data centers to other common databases (e.g., common database 207B of data center 102). Common database 207A, MSS 211A, router 213A, and GUD 215A form a common layer of resources that are shared by all pod units in data center 101.

Figure 3:
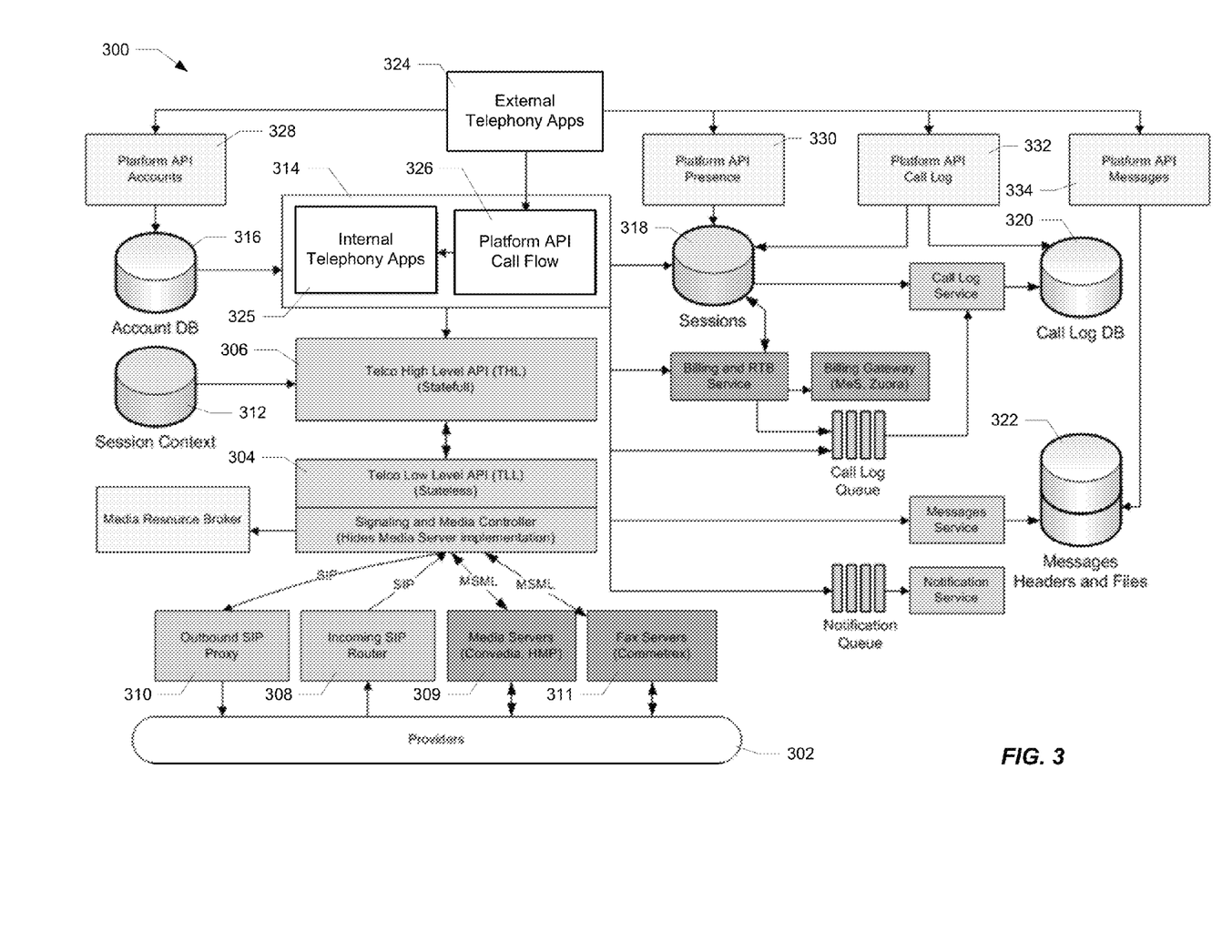
FIG. 3 is a simplified block diagram of an example of a telephony services platform employing techniques as described herein.

FIG. 3 is a simplified block diagram of an example of a PBX platform (e.g., communication system 100 of FIGS. 1 and 2) employing techniques as described herein. PBX platform 300 provides telephony services that allow communication among its users, and between its users and users associated with a variety of external telephony platforms 302 via telecommunication APIs 304 and 306, Outbound SIP Proxy 308, and Inbound SIP Router 310. Media Servers 309 and Fax Servers 311 provide functionality for processing voice over IP and fax over IP data, respectively. Telco API 304 is a stateless low-level API that provides signaling and media telephony primitives including, for example, call answering, placing of outbound calls, creation of conference call objects, addition of calls to conference call objects, playback of media for active calls, recording of active calls, etc. Telco API 306 is a higher-level API that has more sophisticated functionality such as, for example, interactive voice response (IVR), call forwarding, voice mail, etc. In the depicted implementations, telco API 306 doesn't have access to the PBX platforms databases, but maintains session context data 312 to support its functionality. Telco API 306 may include function primitives which can be used to support the development of telephony applications as described herein.

Outbound SIP Proxy 308, and Inbound SIP Router 310 employ the Session Initiation Protocol (SIP), an IETF-defined signaling protocol widely used for controlling communication sessions such as voice and video calls over the Internet Protocol (IP). SIP can be used for creating, modifying and terminating two-party (unicast) or multiparty (multicast) sessions, and may be one of the core protocols employed by systems configured as shown in and described above with reference to FIGS. 1 and 2.

The core functionality of PBX platform 300 (e.g., as described above with reference to FIGS. 1 and 2) is accessed via telephony services block 314 which has access (not entirely shown for clarity) to the various data repositories of PBX platform 300, e.g., account DB 316, sessions DB 318, call log DB, 320 and message DB 322. Telephony services block 314 receives commands from telephony applications 324 and controls execution of the commands on the PBX platform 300. Telephony services block 314 may also include internal telephony applications 325 that are hosted and/or developed on or in connection with PBX platform 300. The depicted implementation also includes various APIs that allow external telephony applications 324 to interact with PBX platform 300 as described herein. The APIs associated with PBX platform 300 allow telephony applications 324 and 325 to integrate with basic functionality of PBX platform 300 at multiple integration points, to control call flows during execution of the call flows by the platform (e.g., via API 326), and to access platform data (e.g., in DBs 316-322 via APIs 328-334).

According to a particular class of implementations, SIP router 310 is configured (in conjunction with a registry maintained, for example, in account DB 316) for handling incoming calls or transmissions directed to a subscriber or endpoint to which a number was previously assigned such that they are not received by the new subscriber or endpoint. According to other implementations, such functionality may be implemented elsewhere in the system, e.g., telephony services block 314, across multiple system components, or on a system components dedicated for that purpose (not shown).

Figure 4:
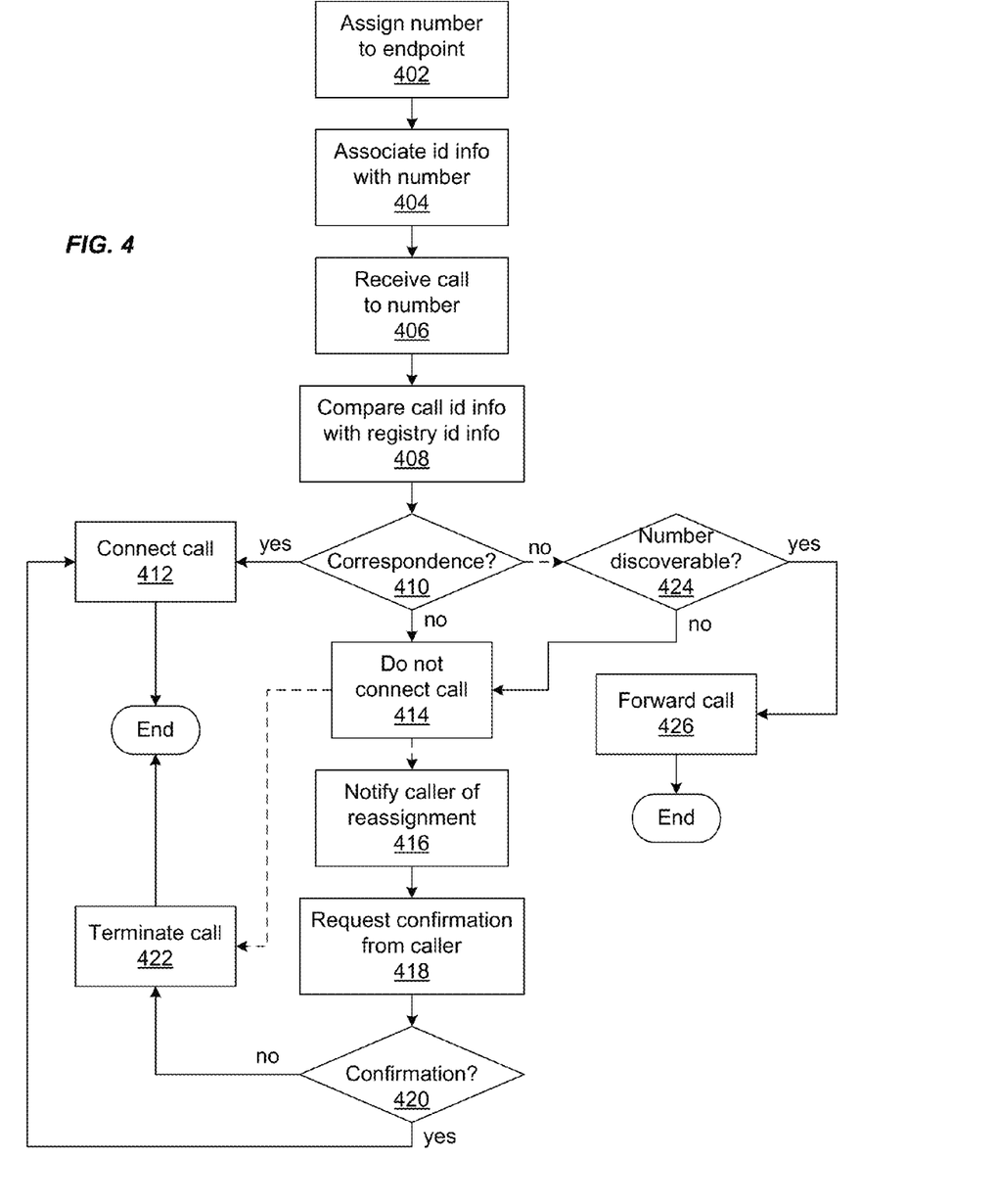
FIG. 4 is a flowchart illustrating handling of an incoming call in the context of a telephony platform according to a particular implementation.

FIG. 4 is a flowchart illustrating handling of an incoming call in the context of a telephony platform (e.g., as shown in FIGS. 1-3) according to a particular implementation. When a phone number is assigned to an endpoint associated with a subscriber (402) an entry is created in a registry that includes identifying information mapping an entity associated with the subscriber to the phone number (404). As discussed above, the entity associated with the subscriber might be a person, an organization, a role within an organization, a group within an organization, etc. In some implementations, the identifying information includes a wide variety of information that points or maps to the entity, or identifies or can be used to identify the entity. According to some implementations, the identifying information may include a GUID that uniquely identifies the subscriber or an entity associated with the subscriber. As discussed above, the registry may be maintained within the telephony platform in a centrally available database or distributed among various databases in the platform; as long as the relevant information in the registry is available to the relevant system component(s) and/or process(es) to facilitate call handling as described herein.

When a call directed to the phone number is received (406), e.g., by SIP router 308 of FIG. 3, a comparison is made between the corresponding identifying information from the registry and identifying information associated with the incoming call (408). The identifying information associated with the incoming call is distinct from the call routing information conventionally used by the telephony platform to route the call to the correct endpoint. According to some example implementations, the identifying information associated with the incoming call may be any of a variety of information that points or maps to, or identifies or can be used to identify the entity to which the incoming call is directed. This might include, for example, a person's name, the name of an organization, etc. Further, this identifying information is derived from a source that is accessible to the device from which the call is received such as, for example, an address book or contact list, an email account, via a browser, etc.

In one example, the calling party initiates the call by selecting the phone number from an entry in a contacts list on his mobile device. An application operating on the mobile device (which may be, for example, a communication application distributed by the service provider associated with the telephony platform) retrieves information associated with the contact entry (e.g., a contact name, a business name, a GUID, etc.) and associates it with the outgoing call. In another example, the identifying information is derived from an address book or contacts list associated with an email account. In another example, it is derived from email correspondence in which the phone number is associated with a name (e.g., in an address or signature block). In yet another example, the identifying information is derived from a web page accessed by the device's browser in which the phone number is associated with a business name, or a web page from which the device user initiated the call (e.g., by selecting a hyperlink associated with the phone number). In still another example in the context of the management of domain names, identifying information could be stored along with a URL in a bookmarks list or a browsing history of a browser (or derived from those sources with a real-time lookup). The identifying information could be transmitted as part of an HTTP header of a request directed to that URL. Those of skill in the art will appreciate that the diversity of these examples illustrates that the sources from which the identifying information associated with the incoming call may be derived may vary considerably without departing from the scope of the disclosure.

In some implementations, a GUID is stored on the calling or transmitting device in conjunction with or as a result of the initial call or transmission to the endpoint associated with the GUID in the registry. For example, upon attempting to connect or connecting with an endpoint (e.g., by making a phone call, sending an email, transmitting an HTTP request, etc.), the GUID for the current entity associated with that endpoint in the registry is transmitted back to the device that initiated the connection, e.g., as part of a response to that device. In the context of a telephony service, for example, the GUID may then be stored in or associated with a contacts list on the device, e.g., as a meta field, a hidden field, a supplemental field, etc. Subsequently, when that contact entry is used to attempt to connect with that endpoint, the GUID is transmitted with the connection request for confirmation of the correspondence between the entity to which the call or transmission is directed and the entity currently associated with the GUID in the registry. In another example, when a contact is transmitted from one device to another (e.g., with a digital vCard), the GUID can be transmitted as a part of the contact and automatically seeded into the recipient's contacts list.

It should be appreciated that the point in time at which the identifying information is derived may vary without departing from the disclosure. For example, the information may be derived each time a call to the telephony platform is initiated. Alternatively, the information may be derived once and stored on the device for use with future calls. And the identifying information may be associated with the incoming call as it is received by the telephony platform, or might be secured in a separate operation, e.g., by the platform sending a request to the calling device after the incoming call is received. This approach is advantageous, for example, where the device from which the incoming call originates has no previous connection with the telephony platform.

According to some implementations, the registry stores the identifying information associated with incoming calls in association with the calling device (e.g., as identified by caller ID, MAC address, IP address, etc.) and the number to which the call is directed. In such cases, it may no longer be necessary to maintain or update the identifying information on the calling device, or to transmit the identifying information with subsequent calls to that number. That is, upon receiving a request to connect with a particular number, the calling device can be identified (e.g., by the caller ID or device ID) and a lookup performed to determine what the identifying information received from the calling device for that number was at the time it was last stored in the registry. If that information does not correspond to the identifying information maintained in the registry for that number, then the appropriate remedial actions can be performed as described elsewhere herein.

To facilitate such a lookup, a key may be formed by combining a value representing the calling device (e.g., the caller ID, device ID, etc.) with the phone number. In order to provide some degree of privacy, the key could be converted through a one-way hashing function with optional "salt," i.e., additional random data added to the input to the hashing function. As an alternative to a lookup-based approach, the identifying information associated with previous incoming calls from a particular device can be determined from call logs for the calling device maintained by the telephony system.

Referring again to FIG. 4, if it is determined from the comparison that the entity to which the call is directed (as identified by the identifying information associated with the incoming call) corresponds to the entity associated with the phone number (as identified in the registry) (410), the call is connected with or routed to the endpoint associated with the phone number (412). On the other hand, if there is not a correspondence between those entities (410), the connection is not made (414).

The comparison between the identifying information associated with the incoming call and the identifying information from the registry may be made by the system component or process that receives the incoming call (e.g., SIP router 308), or may be handled by a system component or process in communication with that component or process and dedicated to handling calls as described herein. Moreover, depending on the matching rules employed in the comparison, the correspondence between the two entities associated with the compared information need not be exact. For example, the identifying information associated with an incoming call might include only a last name of the party to whom the call is directed, while the registry includes the full legal name of person to whom the phone number and/or its corresponding endpoint has been assigned. In such a case, the matching rules might require only a partial match. The matching rules might also handle misspellings and/or use matching techniques designed to identify correspondence between similar words or phrases (e.g., stemming) to find correspondence.

In some implementations, the matching rules employ multiple pieces of information to determine correspondence; not all of which need to match. For example, the identifying information associated with an incoming call might identify a specific person, an organization with which the person is associated, and the person's role within the organization. The identifying information associated with the phone number in the registry might include some or all of these categories of information (and possibly additional information). The matching rules may be configured to find correspondence where the organization and the role match, but the person does not. This would allow a call to be routed to the correct person at an organization, even where the person receiving the call is new to the organizational role. In another example, the call is routed even where there is only correspondence at the organizational level. This would allow all calls directed to a business, for example, to go through. In yet another example, all of the categories of information might need to match in order for there to be correspondence.

It should be noted that different types of identifying information and/or different matching rules may be used for different subscribers to the telephony platform. For example, identifying information maintained in the registry for a subscriber that is an enterprise might include multiple pieces of information for each telephone number assigned to the enterprise, while identifying information maintained for an individual might include fewer; even just one, e.g., a last name. In addition, the matching rules for an organization might be different than for an individual. That is, an organization might want a call to go through even though the phone number has been reassigned within the organization, while an individual subscriber is only likely to want the call to go through if it is clearly directed to him. Each subscriber may even be allowed to customize the identifying information maintained in the registry and/or the matching rules used to determine correspondence according to their individual goals.

As will be appreciated, various implementations of the present invention can dramatically reduce the likelihood and incidence of calls directed to one party reaching another in error. Not only will this capability serve to improve the experience of telephony platform users, it may also reduce or even eliminate the need for quarantining phone numbers before they are reassigned. That is, quarantine periods can be shortened or even eliminated in view of the fact that the mechanisms described herein may reduce or eliminate undesirable call connections in a flexible and reliable manner.

According to some implementations and referring again to FIG. 4, where the connection to the phone number is not made (414), a notification is sent to the device from which the call originated, informing the caller of the change in assignment (416). The notification might simply inform the caller that the number has been reassigned, allowing the caller to make the appropriate change in his contacts so that an attempt to contact the previous entity associated with that phone number is unlikely to be made again; at least by that caller. According to one implementation, a web page is launched or a hyperlink provided that connects to information about the entity currently associated with the number. In another alternative, the caller might be informed of the reassignment or that the entity to which his call was directed did not match the entity to which the number is assigned, and optionally (as indicated by the dashed line) be provided with an opportunity to confirm that the call should proceed (418). Such an approach might be useful where, for example, the caller is attempting to contact an organization or a person having a particular role in an organization and doesn't really care whether it is the same person as the last time he called. If the caller confirms that the call should go through (420), the connection is made (412). Otherwise the connection is not made and the call is terminated (422). Whether or not an option like this is presented to the caller may be controlled by the subscriber.

FIG. 4 also illustrates an alternative approach for cases in which correspondence between the entity to which a call is directed and the entity associated with the number in the registry is not found. That is, implementations are contemplated in which the registry may redirect the incoming call to the correct entity. When correspondence is not found (410), it is determined whether the identifying information associated with the incoming call may be used to discover a new number assigned to the entity to which the call was directed (424). This may be discoverable from the registry itself by identifying an entry associating the party to which the call is directed with a different number. It may also be discoverable from external sources, e.g., by performing a web search using the identifying information. If a new number is discoverable (424), the incoming call is forwarded to the new number (426). If not, the call is not connected (414) and the process can proceed as described above.

According to some implementations, the identifying information from the calling device may be updated to reflect a reassignment of the number, address, or pointer maintained by the registry. For example, a reassigned GUID could be associated with a new contact in the device's contact book. Alternatively, a contact in the contacts list that does not include a GUID can be updated to include one. This may be done automatically, or upon requesting confirmation from the user. The updating of identifying information on the calling device may also be accomplished according to a push model involving a synchronization process (e.g., triggered periodically or in response to application startup) that compares the identifying information on the calling device (e.g., as stored in its contacts list) with the identifying information maintained in the registry; updating any associations that are out of date. Such an approach might be further facilitated according to a subscription model in which the registry tracks the identifying information maintained in the registry that has corresponding identifying information maintained on particular calling devices. For example, if a GUID is stored in the contacts list of a particular device, the registry tracks this association and, if the endpoint associated with that GUID in the registry changes, the device could be notified of the reassignment.

Figure 5:
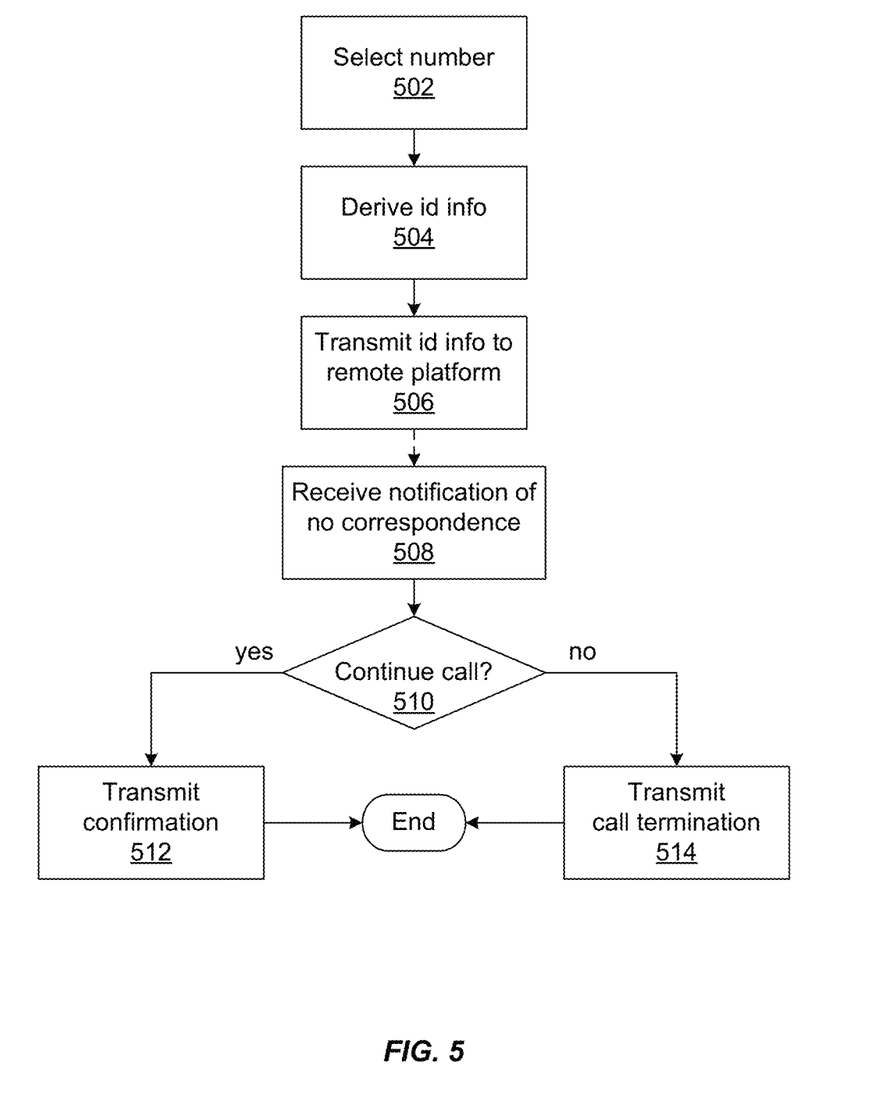
FIG. 5 is a flowchart illustrating generation of a call to an endpoint associated with a telephony platform according to a particular implementation.

As mentioned above, implementations are contemplated in which the device from which an incoming call originates runs an application that may perform at least some of the tasks associated with call handling as described herein. FIG. 5 is a flowchart illustrating generation of a call to an endpoint associated with a telephony platform (e.g., as shown in FIGS. 1-3) according to such an implementation. The application might be, for example, a telephony app compatible with and distributed by the service provider associated with the telephony platform. When the caller associated with the device selects a phone number associated with the telephony platform for initiating a call (502), identifying information representing the entity to which the call is directed is derived (504). As discussed above, this information may correspond to a wide range of information that can be used to identify the party the caller is trying to reach, and may be derived at the time the call is initiated or at a previous time.

When the call is initiated, the identifying information is transmitted (in addition to any call routing information) to the telephony platform for comparison with the identifying information in the registry for that phone number (506). If the comparison is successful, the call is connected and proceeds as normal. If the comparison fails entirely or in some respect, the caller receives a notification (508) that may include the option of confirming whether the call should be connection (510). The caller may choose to continue with the call (512) or allow it to be terminated (514). Optionally, the caller could be presented with an option to automatically update the out-of-date identifying information (phone number) in his contacts list for the party they called and that was identified in the registry by the identifying information transmitted by the caller to the telephony platform.

It should be noted that, despite references to particular computing paradigms and software tools herein, the computer program instructions with which embodiments of the invention may be implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations. In addition, reference to particular protocols herein are merely by way of example. Suitable alternatives or those later developed known to those of skill in the art may be employed without departing from the scope of the invention.

It will be appreciated with reference to the foregoing, that techniques described herein may be particularly advantageous in contexts in which the addresses or pointers being managed are designed to be human-readable and human friendly and are, as a result, in limited supply. In such contexts, it is common that these addresses or pointers are frequently reassigned. Domain names and email addresses are good examples of this. By maintaining a registry that tracks the entities to which such addresses or pointers are assigned, not only are erroneous connections avoided, a variety of other functionalities may be provided. For example, an erroneously directed call or transmission may be redirected to the correct party. In another example, the calling party's identifying information may be updated to ensure that future calls or transmissions are not misdirected and/or are directed to the correct party.

While the present disclosure has been particularly shown and described with reference to example embodiments thereof, it will be understood by those skilled in the art that changes in the form and details of the disclosed embodiments may be made without departing from the spirit or scope of the disclosure. For example, the techniques described herein may be applied to a variety of contexts and are not limited to telephony platforms or services. According to various classes of implementations, the techniques described herein may be used in connection with the management and assignment of Internet Protocol (IP) addresses, uniform resource indicators (URIs—including both uniform resource locators (URLs) and uniform resource names (URNs)), email addresses, etc. The scope of the invention should therefore not be limited by reference to the context of telephony.

Implementations are also contemplated in which a registry as described herein may be used as an authority for determining whether a number, address, or pointer managed by the registry should be used in connection with a transaction or session in which a user or device is attempting to interact with an endpoint to which the number, address, or pointer is assigned. That is, the registry may determine that identifying information maintained by the registry should be used in preference over the number, address, or pointer with which it is associated when engaging, for example, with APIs and/or other systems. For example, a maps application on a smart phone device allows a user to search for local businesses and may display a phone number for a specific local business in the results of a search. The user can initiate a call to that business (e.g., by tapping the phone number). Such a situation is an example of where the identifying information maintained in the registry might be given priority over the phone number with which it is associated in the maps application interface. That is, if the phone number previously assigned to that business has been reassigned, the interface (e.g., a web page) could be updated to include the identifying information from the registry relating to the entity to whom the number has been reassigned, or a new phone number assigned to that business. This helps to ensure that the user can connect with the business he is trying to reach.

Finally, although various advantages, aspects, and objects of the present disclosure have been discussed herein with reference to various example embodiments, it will be understood that the scope of the disclosure should not be limited by reference to such advantages, aspects, and objects.

What is claimed is:

1. A computer-implemented method, comprising:
   associating first identifying information with a phone number reassigned to a subscriber, the first identifying information representing a first entity corresponding to the subscriber;
   receiving an incoming call directed to the phone number and having second identifying information associated therewith, the second identifying information representing a second entity to which the incoming call is directed;
   comparing the second identifying information with the first identifying information to determine whether the second entity corresponds to the first entity; and
   where the second entity corresponds to the first entity, connecting the incoming call with a network endpoint corresponding to the phone number.

2. The method of claim 1, further comprising:
   receiving a second incoming call directed to the phone number and having third identifying information associated therewith, the third identifying information representing a third entity to which the second incoming call is directed;
   comparing the third identifying information with the first identifying information to determine whether the third entity corresponds to the first entity; and
   where the third entity does not correspond to the first entity, preventing the second incoming call from connecting with the network endpoint corresponding to the phone number.

3. The method of claim 2, further comprising transmitting a notification to a device from which the second incoming call originated, the notification indicating that the phone number has been reassigned.

4. The method of claim 2, further comprising transmitting a communication to the device regarding whether the second incoming call should proceed.

5. The method of claim 1, wherein the second identifying information was derived from a source accessible to a device from which the first incoming call originated.

6. The method of claim 5, wherein the source comprises one or more of an address book accessible to the device, an email account accessible to the device, or a browser accessible to the device.

7. The method of claim 1, wherein the subscriber is an organization, and wherein the first entity is a person, role, or group associated with the organization.

8. The method of claim 1, wherein the second identifying information is distinct from call routing information associated with the incoming call.

9. A telephony platform, comprising:
   one or more data stores having first identifying information stored therein for a phone number reassigned to a subscriber, the first identifying information representing a first entity corresponding to the subscriber; and
   one or more computing devices configured to:
   receive a first incoming call directed to the phone number and having second identifying information associated therewith, the second identifying information representing a second entity to which the first incoming call is directed;

compare the second identifying information with the first identifying information to determine whether the second entity corresponds to the first entity; and where the second entity corresponds to the first entity, connect the first incoming call with a network endpoint corresponding to the phone number.

10. The telephony platform of claim 9, wherein the one or more computing devices are further configured to:

receive a second incoming call directed to the phone number and having third identifying information associated therewith, the third identifying information representing a third entity to which the second incoming call is directed;

compare the third identifying information with the first identifying information to determine whether the third entity corresponds to the first entity; and where the third entity does not correspond to the first entity, prevent the second incoming call from connecting with the network endpoint corresponding to the phone number.

11. The telephony platform of claim 10, wherein the one or more computing devices are further configured to transmit a notification to a device from which the second incoming call originated, the notification indicating that the phone number has been reassigned.

12. The telephony platform of claim 10, wherein the one or more computing devices are further configured to transmit a communication to the device regarding whether the second incoming call should proceed.

13. The telephony platform of claim 9, wherein the second identifying information was derived from a source accessible to a device from which the first incoming call originated.

14. The telephony platform of claim 13, wherein the source comprises one or more of an address book accessible to the device, an email account accessible to the device, or a browser accessible to the device.

15. The telephony platform of claim 9, wherein the subscriber is an organization, and wherein the first entity is a person, role, or group associated with the organization.

16. The telephony platform of claim 9, wherein the second identifying information is distinct from call routing information associated with the first incoming call.

17. A computer program product, comprising one or more computer-readable media having computer program instructions stored therein, the computer program instructions being configured such that, when executed by one or more computing devices, the computer program instructions cause the one or more computing devices to:

associate first identifying information with a phone number reassigned to a subscriber, the first identifying information representing a first entity corresponding to the subscriber;

receive an incoming call directed to the phone number and having second identifying information associated therewith, the second identifying information representing a second entity to which the incoming call is directed;

compare the second identifying information with the first identifying information to determine whether the second entity corresponds to the first entity; and where the second entity corresponds to the first entity, connect the incoming call with a network endpoint corresponding to the phone number.

18. The computer program product of claim 17, wherein the computer program instructions are further configured to cause the one or more computing devices to:

receive a second incoming call directed to the phone number and having third identifying information associated therewith, the third identifying information representing a third entity to which the second incoming call is directed;

compare the third identifying information with the first identifying information to determine whether the third entity corresponds to the first entity; and where the third entity does not correspond to the first entity, prevent the second incoming call from connecting with the network endpoint corresponding to the phone number.

19. The computer program product of claim 18, wherein the computer program instructions are further configured to cause the one or more computing devices to transmit a notification to a device from which the second incoming call originated, the notification indicating that the phone number has been reassigned.

20. The computer program product of claim 18, wherein the computer program instructions are further configured to cause the one or more computing devices to transmit a communication to the device regarding whether the second incoming call should proceed.

21. The computer program product of claim 17, wherein the second identifying information was derived from a source accessible to a device from which the first incoming call originated.

22. The computer program product of claim 21, wherein the source comprises one or more of an address book accessible to the device, an email account accessible to the device, or a browser accessible to the device.

23. The computer program product of claim 17, wherein the subscriber is an organization, and wherein the first entity is a person, role, or group associated with the organization.

24. The computer program product of claim 17, wherein the second identifying information is distinct from call routing information associated with the incoming call.

25. A computer-implemented method, comprising:

associating first identifying information with an endpoint identifier, the endpoint identifier corresponding to a network endpoint, the first identifying information representing a first entity to which the network endpoint is reassigned;

receiving an incoming transmission directed to the network endpoint and having second identifying information associated therewith, the second identifying information representing a second entity to which the incoming transmission is directed;

comparing the second identifying information with the first identifying information to determine whether the second entity corresponds to the first entity; and where the second entity corresponds to the first entity, directing the incoming transmission to the network endpoint.

26. The method of claim 25, wherein the endpoint identifier is one of a phone number, an email address, or a uniform resource identifier (URI).

27. The method of claim 26, wherein the endpoint identifier is a phone number, and wherein the first entity is an organization or a person, role, or group associated with the organization.

28. The method of claim 25, further comprising:

receiving a second incoming transmission directed to the network endpoint and having third identifying information associated therewith, the third identifying information representing a third entity to which the second incoming transmission is directed;

comparing the third identifying information with the first identifying information to determine whether the third entity corresponds to the first entity; and where the third entity does not correspond to the first entity, preventing the second incoming transmission from connecting to the network endpoint.

29. The method of claim 28, further comprising transmitting a notification to a device from which the second incoming transmission originated, the notification indicating that the network endpoint has been reassigned.

30. The method of claim 25, wherein the second identifying information is distinct from routing information associated with the incoming transmission.

* * * * *